(12) United States Patent
Hommer et al.

(10) Patent No.: US 7,655,710 B2
(45) Date of Patent: Feb. 2, 2010

(54) USE OF WATER-SOLUBLE POLYMERS AS AUXILIARY DRYING AGENTS FOR THE PRODUCTION OF POLYMER DISPERSING AGENTS

(75) Inventors: Herbert Hommer, Mühldorf (DE); Manfred Bichler, Engelsberg (DE); Werner Strauβ, Trostberg (DE); Konrad Wutz, Trostberg (DE)

(73) Assignee: BASF Construction Polymers GmbH, Trostberg (DE)

( * ) Notice: Subject to any disclaimer, the term of this patent is extended or adjusted under 35 U.S.C. 154(b) by 0 days.

(21) Appl. No.: 10/515,004

(22) PCT Filed: May 21, 2003

(86) PCT No.: PCT/EP03/05336
§ 371 (c)(1),
(2), (4) Date: Jan. 25, 2006

(87) PCT Pub. No.: WO03/097721
PCT Pub. Date: Nov. 27, 2003

(65) Prior Publication Data
US 2006/0111478 A1    May 25, 2006

(30) Foreign Application Priority Data
May 22, 2002    (DE) ............................ 102 22 530
Dec. 24, 2002    (DE) ............................ 102 60 989

(51) Int. Cl.
*C08B 24/26* (2006.01)
*C08J 3/12* (2006.01)

(52) U.S. Cl. .................. 524/5; 524/558; 524/449; 524/447; 523/342; 523/332

(58) Field of Classification Search .............. 524/5, 524/558; 523/342, 332

See application file for complete search history.

(56) References Cited

U.S. PATENT DOCUMENTS 6,133,345 A * 10/2000 Pakusch et al. ............. 523/342

FOREIGN PATENT DOCUMENTS

| DE | 2 238 903 | | 8/1972 |
|---|---|---|---|
| DE | 3344 242 | A1 | 12/1983 |
| DE | 44 06 822 | A | 9/1995 |
| DE | 195 39 460 | A1 | 4/1997 |
| EP | 0 467 103 | A | 1/1992 |
| EP | 0 601 518 | A1 | 6/1994 |
| EP | 0 629 650 | A1 | 12/1994 |
| EP | 0 671 435 | A1 | 9/1995 |
| EP | 0861 867 | A | 9/1998 |
| JP | 06 239542 | A | 8/1994 |
| JP | 06 239652 | A | 8/1994 |
| WO | WO 98/28353 | | 7/1998 |

* cited by examiner

*Primary Examiner*—David Wu
*Assistant Examiner*—Michael M Bernshteyn
(74) *Attorney, Agent, or Firm*—Fitch, Even, Tabin & Flannery (57) ABSTRACT

The invention relates to the use of water-soluble polymers, consisting of a) monoethylenically unsaturated monomers consisting of acidic groups in an acidic, partially or fully neutralized form and b) other monomers which can be copolymerized with monomers a) as a drying agent for the production of redispersion power and/or powdery polymer dispersing agents. The water-soluble polymers contain at least 20 wt. % monomers (a) and a maximum of 8O wt. % monomers (b) and are supplied to the production process in the form of aqueous solutions in amounts of up to 50 wt. % maximum, enabling powder, polymer products with a residual moisture of <2 wt. % to be obtained, particularly in spray drying processes, and which are added to mineral systems as dispersing agents in amounts of 0.05-5 wt. % or are used as building materials for the mineral binding of redispersion powder in adhesives or as a binders in their own right.

27 Claims, 1 Drawing Sheet

Figure 1:
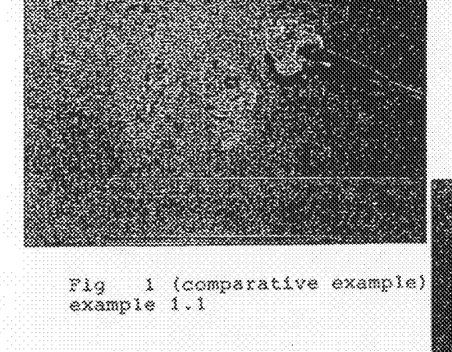

Fig 1 (comparative example)
example 1.1

Figure 2:
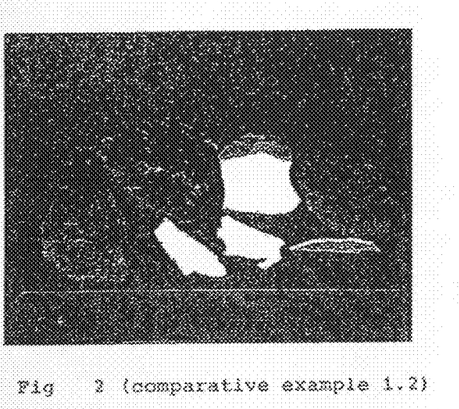

Fig 2 (comparative example 1.2)

Figure 3:
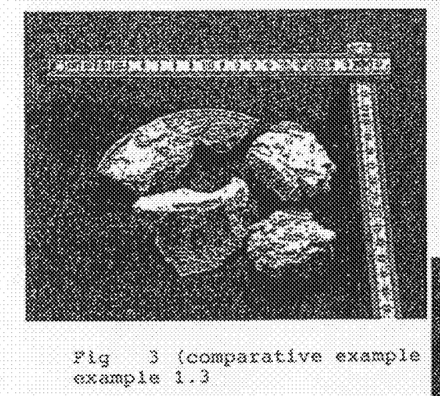

Fig 3 (comparative example
example 1.3

Figure 4:
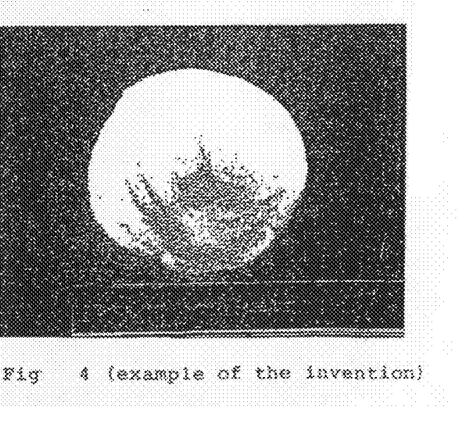

Fig 4 (example of the invention)

USE OF WATER-SOLUBLE POLYMERS AS AUXILIARY DRYING AGENTS FOR THE PRODUCTION OF POLYMER DISPERSING AGENTS

The present invention concerns the use of water-soluble polymers of a defined composition as a drying aid for the production of redispersion powders and/or polymeric dispersants in powder form.

Aqueous polymer dispersions are generally known. They are systems with redispersing properties which essentially contain spherical coils of intertwined polymer chains (so-called polymer particles) in a disperse distribution. Like polymer solutions, when the solvent is evaporated, aqueous polymer dispersions have the potential to form polymer films when the aqueous dispersing medium evaporates which is why they are used in particular as binding agents, adhesives and coating agents.

A disadvantage in using aqueous polymer dispersions is that this form is not completely satisfactory for sale. Thus when they are transported from the site of production to the site of use, this always involves transporting the mixing water which is readily available everywhere in addition to transporting the modified polymer. Furthermore, for purposes of modification mineral binders cannot be added to aqueous polymer dispersions until they have reached the site of use since they would otherwise harden before use. Moreover, problems caused by phase separation, after-thickening, damage by the action of frost and bacteria can occur in the polymer dispersions due to their complex composition during storage and transport of the ready-to-use formulation.

Hence a desirable form of aqueous polymer dispersions when adding water is a redispersible polymer powder. A major advantage of redispersion powders compared to liquid dispersions is that one can produce dry mortar mixtures which only have to be additionally mixed with water at the building site. This has major advantages such as increased working safety, safer handling and easier emptying of the package.

Dispersants and in particular to cement dispersants are often added in the building industry to hydraulically hardening building materials in order to achieve an adequate flowability and workability of the concrete or mortar which is especially important at low so-called w/c values. The lower the water/cement (w/c) ratio, the greater is the increase in mechanical stability and durability of hardened cement-containing building materials such as concrete or mortar. However, the consistency and workability of these building materials decrease as the w/c ratios become lower.

The melamine-formaldehyde sulfite and naphthalene-sulfonic acid-formaldehyde resins that have been used for a long time often no longer meet current requirements since, among others, great importance is attached to long workability together with a rapid development of strength and high mechanical stability of the end product. Another problem arises when such flow agents are used in mining (as sprayed concrete) and for interior work where the toxicologically questionable formaldehyde which is present in the products as a result of the production process may be released resulting in occupational exposure.

Hence cement dispersants based on polycarboxylate ethers which are much more able to fulfil the above-mentioned requirements have been used for some time. These polycarboxylate ethers are produced by means of radical polymerization reactions preferably in an aqueous medium and are formed as an aqueous solution. The polymerization can, however, also take place in mixtures of water and organic solvents or in an emulsion or in bulk.

In fields of application in which the polymers are required as an additive to dry mixtures that are prefabricated in the factory, it is also disadvantageous or even completely impossible to use aqueous formulations. Hence for such fields it is absolutely essential to provide all additives and thus also the dispersant in a powder form.

A particularly practical method for converting an aqueous polymer dispersion into a redispersible polymer powder or a dispersant in a powder form is the spray drying process in which the polymer dispersion is sprayed into a flow of hot air to remove water. Since the polymers used to modify mineral binders or used as binders for plastic plasters usually have a glass transition temperature below 60° C., the spray drying process cannot be used at all to produce redispersible polymer powders thereof without also using spraying aids or only in an uneconomical temperature range. Another disadvantage of polymer powders produced by drying aqueous polymer dispersants without spraying aids is that they cannot usually be redispersed completely satisfactorily when water is added because the resulting polymer diameter distribution in the redispersion usually differs considerably from that in the aqueous starting dispersion (distribution of primary particle diameters).

It is also known that insoluble gels which in turn have a poor activity (JP 07-14829) are often formed in conventional drying methods when producing powder dispersants having a high water solubility.

One is also confronted with the problem that not inconsiderable amounts of polymer powder stick to the walls of the drying tower which drastically reduces the product yield.

Another disadvantage of the conventional spray drying process for this type of polymer is that not inconsiderable amounts of inorganic additives often have to be added before the drying which inevitably leads to a decrease in the amount of active substance in the resulting powder; or the polymer is absorbed by the carrier material which again results in considerable losses of activity in the application.

Furthermore, when inorganic materials with a relatively high density are added to the polymer solution, the carrier material readily sediments. If this occurs during transport of the polymer solution from the storage container to the drying unit, it results in a large degree of inhomogeneity in the end product.

In order to solve these problems, one has attempted to add one or more reducing agents to the polymer solution and then dry it by kneading and mixing (EP 1 052 232 A1). However, this process is very laborious, since the concentrated polymer solution usually has to be dried under a vacuum and inert gas. Furthermore, pulverizing highly viscous solutions often strains the motor of the drying units beyond their performance limit which results in an automatic shutdown and thus to economically disadvantageous downtimes. Moreover, the operating sequence in such a process is no longer reliable. Finally, in these processes the solid polymer often has to be further reduced in size and/or ground which necessitates an additional processing step and results in additional costs.

Compounds have been known for a long time which, when added to aqueous polymer dispersions, reduce the phenomenon that has already been described as undesired of irreversible secondary particle formation. These compounds are often grouped under the generic term drying aids. Many of them are also known in particular as spraying aids since the already mentioned spray drying promotes the formation of irreversible secondary particles to a major extent. In general spraying aids prevent caking and aggregation during the drying process and usually also reduce the formation of a polymer coat adhering to the drier wall during spray drying and thus increase the yield of powder.

Thus, for example, in DE-OS 20 49 114 and DE-PS 44 34 010 condensation products of melamine sulfonic acid and formaldehyde are recommended as drying agents for aqueous polymer dispersions whereas DE-OS 24 45 813 and EP-A 78 449 disclose condensation products of naphthalene-sulfonic acid and formaldehyde.

EP-A 407 889 recommends condensation products of phenolsulfonic acid and formaldehyde as drying agents for aqueous polymer dispersions.

DE-OS 24 45 813 recommends condensation products containing sulfone groups consisting of mononuclear or polynuclear aromatic hydrocarbons and formaldehyde as drying aids whereas DE-OS 41 18 007 describes condensation products consisting of sulfonated phenols, urea, other organic nitrogen bases and formaldehyde as drying agents.

Lignin sulfonates are mentioned in DE-OS 33 44 242 as drying aids.

DE-OS 22 38 903 and EP-A 576 844 describe the use of poly-N-vinylpyrrolidone as a drying aid, EP-A 62 106, EP-A 601 518 and EP-PS 632 096 describe the use of polyvinyl alcohols as drying aids.

DE-OS 195 39 460, EP-A 671 435 and EP-A 629 650 disclose homopolymers and copolymers of 2-acrylamido-2-methylpropanesulfonic acid as suitable drying aids for aqueous polymer dispersions.

EP-A 467 103 describes the production of polymer powders that can be redispersed in aqueous media by drying and with addition of copolymers of 50 to 80 mole % of an olefinic unsaturated monocarboxylic acid and/or dicarboxylic acid and 20 to 50 mole % of a $C_3$- to $C_{12}$-alkene and/or styrene as drying aids.

According to DE-OS 44 06 822 graft polymers of polyalkylene oxides and unsaturated monocarboxylic acids/dicarboxylic acids and anhydrides thereof are recommended as drying aids after derivatization with primary/secondary amines or alcohols.

DE-OS 33 44 242 and EP-A 536 597 mention starches and starch derivatives as suitable drying aids whereas DE-OS 33 42 242 also discloses cellulose derivatives as suitable drying aids.

Finally DE-OS 493 168 recommends organopolysilanes as drying aids. The spraying aids known from the described prior art have a wide variety of disadvantages: If the naphthalene-sulfonic acid- or phenolsulfonic acid-formaldehyde condensation products known from DE-OS 24 45 813, EP-A 78 449 and EP-A 407 889 are used, one obtains coloured products. Condensation products of sulfonated phenols, ureas, other nitrogen bases and formaldehydes as spraying agents as described in DE-OS 41 18 007, are white after the spray drying but have a strong tendency to form a colour again in a strongly alkaline environment as is typical for mineral binders and in the presence of metal ions. Furthermore, long storage reduces their redispersibility since the powder particles have a tendency to stick to one another or interlock under the own weight of the powder. One disadvantage in using the formaldehyde-containing condensation products mentioned above is that aqueous solutions thereof have a significant content of free formaldehyde. This results in formaldehyde contamination of the flow of exhaust air during drying which necessitates a costly purification of the exhaust air.

Another disadvantage of redispersion powders produced in this manner is that formaldehyde may be released during or after its use due to decomposition reactions such as those that can occur in the basic environment of a cementitious matrix. As a result such redispersible dispersions are being avoided more and more especially for interior applications for ecological and health reasons.

The spraying aids known from DE-OS 41 18 007 and EP-A 467 103 impair the product properties of the polymers sprayed with them as binders in the application. A disadvantage of the spraying aids is their completely or partially neutralized water-soluble copolymers which contain 50 to 80 mole % of monomers having carboxyl groups in addition to hydrophobic monomers (EP-A 467 103). On the basis of such polymer powders it is for example not possible to formulate plastic plasters with a completely satisfactory water resistance. This also applies to spraying aids based on vinylpyrrolidone/vinyl acetate according to EP-A 78 449 or polyvinyl alcohol according to DE-OS 22 14 410: Another disadvantage of spraying aids of the prior art is that they do not have a neutral behaviour with regard to the hardening period of modified mortars or concretes but rather as a rule delay the hardening. The spraying aids according to EP-A 629 650 are also unsuitable for drying aqueous polymer dispersions.

It is undisputed that powders not only have logistic and economical advantages over aqueous formulations since in particular no transport of water takes place, but they also have a number of technical advantages. Thus, for example, it is not necessary to add biocides for stabilization purposes nor is it necessary to carry out measures for tank hygiene which may be complicated. Hence in general the use of powders is desirable.

Hence the object of the present invention is to provide suitable drying aids for producing redispersion powders and/or polymeric dispersants in a powder form. These drying aids should not have an adverse effect on the original polymer properties with regard to their effect especially in hydraulic systems and they should in general not give rise to undesired side-effects such as discolouration or an increase in viscosity when they are processed in the building material system. In addition the drying aid should be very compatible with the redispersion powder or the polymeric dispersant in order to prevent a possible phase separation or a separation of the components before the drying process. The drying aids should also be suitable for producing polymer powders that can be redispersed in an aqueous medium which can also be used as an additive in mineral binders but also for example be suitable for producing plastic plasters. Finally the polymer powders obtained in this manner should be free of toxicologically questionable components such as formaldehyde.

This object is achieved by the use according to the invention of water-soluble polymers comprising a) monoethylenically unsaturated monomers carrying acidic groups in an acidic, or partially or completely neutralized form from the series acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid and (semi)esters and/or amides of the said carboxylic acids and mixtures and/or anhydrides thereof and optionally b) other monomers that can copolymerize with the monomers of group a) from the series (meth)acrylnitrile, (meth)allyl alcohol, vinyl ethers such as hydroxy- and alkoxypolyethyleneoxy or -polypropyleneoxyvinyl ethers and analogous allyl ethers containing up to 10 repeating units such as e.g. polyethylene glycol monoal- 
lyl ethers or mixed ethylene oxide (EO)-propylene oxide (PO)-mono-allyl ethers, N-vinylacetamide, N-vinyllactams, N-vinylpyrrolidone, N-vinylimidazole, silicon-functional comonomers such as (meth-)acryloxyalkyl-tri-(alkoxy)silanes, vinyltrialkoxysilanes and vinylmethyldialkoxysilanes containing $C_1$ to $C_5$ alkyl or alkoxy residues and derivatives and mixtures thereof as drying aids for producing redispersion powders and/or polymeric dispersants in powder form.

Surprisingly it turned out that the polymers used according to the invention are extremely effective in spray drying because they advantageously prevent the polymer powder from sticking during the production process. Furthermore, it is surprising that the spraying aid according to the invention can also be used in amounts that exceed those required for spray drying but nevertheless considerable reduce the blocking tendency of the dispersion powder without adversely affecting the physical properties of the mineral setting binder systems. Moreover, it was completely surprising and unpredictable that the redispersible powders produced by the claimed use have a positive effect on the flow properties and thus the working properties and surface properties of mineral setting binders without having a dispersing effect on the individual components.

With regard to the powdered polymeric dispersants it was surprisingly found that the use of the described water-soluble polymers allow it to be produced in a high quality powder form in very good yields and without encrustations on the drier wall using conventional spray drying and no subsequent pulverizing or sieving steps are necessary. It was not foreseeable that the claimed use would additionally make this possible in addition to the desired requirements according to the object.

The water-soluble polymers that are intended for the use according to the invention are known. Thus DE-OS 196 25 984 describes a process for producing an aqueous polymer dispersion by polymerizing a) monoethylenically unsaturated monomers carrying acidic groups in an acidic or partially or completely neutralized form in the presence of hydrophilized, vegetable and/or animal and/or commercial fats or oils with optionally b) other monomers that can be copolymerized with the monomers a) wherein acrylic acid, methacrylic acid and methallylsulfonic acid are used among others as monomers a). However, these aqueous polymer dispersions are only used for emulsifying hydrophobic compounds or for producing and processing leather and furs.

DE-OS 195 16 957 describes among others a process for producing water-soluble polymers suitable for detergents and cleaning agents which are produced from mono-ethylenically unsaturated dicarboxylic acids, monoethylenically unsaturated monomers containing sulfonic acid or sulfate groups and monoethylenically unsaturated monomers that can be converted after acid hydrolysis or alkaline saponification into monomer units with covalently bound hydroxyl groups and optionally other monomers that can be copolymerized by means of radicals in which the target polymers are formed by radical polymerization and hydrolysis or saponification in aqueous media at 40 to 180° C. Although the use of the polymers obtained in this manner as dispersants is described in this document, it does not describe their suitability as drying aids in the production of redispersible polymer powders or powdered polymeric dispersants.

It was now found according to the invention that the said water-soluble polymers can be used as drying aids for producing redispersion powders and powdered polymeric dispersants. Polymers used to modify mineral binders usually have a glass transition temperature below 60° C. which is why spraying aids must also be added in order to produce polymer powders economically. Dispersants for cementitous systems have polyglycol-containing side chains as an important structural feature and also have low glass transition temperatures which, according to the literature, should be between 158 and 233° Kelvin (cf. e.g. J. Brandrup, E. H. Immergut, Polymer Handbook $3^{rd}$ Ed., Sec. VI, 229, J. Wiley, 1989). As a result of the low glass transition temperature property, the dispersants have relatively low softening temperatures which are considerably below the drying temperatures used for spray drying. In order to enable dispersants in powder form to be produced by spray drying and to carry out this spray drying under economical conditions, it is necessary to add the drying aids. Thus redispersible polymer powders and dispersants in powder form have the common physical property of a low glass transition temperature and in particular a glass transition temperature of ≦60° C.

Within the scope of the present invention water-soluble polymers have proven to be particularly suitable which contain at least 20% by weight, preferably at least 30% by weight of monomers a) and at most 80% by weight of monomers b). The water-soluble polymers additionally preferably contain at least 5% by weight, in particular at least 10% by weight of monomers b).

Within the scope of the use according to the invention it has also proven to be advantageous when the acidic groups of the monoethylenically unsaturated monomers a) are at least partially neutralized before, during or after polymerization. The at least partial neutralization can in particular be carried out with the aid of alkali and/or alkaline-earth hydroxides, ammonia, an amine, polyamine or amino alcohol.

Preferred monomers of group a) are (meth)acrylamide and hydroxyalkyl(meth)-acrylate in which alkyl=$C_1$ to $C_5$, hydroxyalkyl-polyethyleneoxy- and -propylene-oxy and -butyleneoxy(meth)-acrylate in which alkyl=$C_1$ to $C_5$.

For certain applications it may be advantageous when the water-soluble polymer has an average molecular weight of $M_n$ of 1000 to 100,000 g/mol and preferably between 2000 and 70,000 g/mol, particularly preferably between 3000 and 50,000 g/mol which is also taken into consideration by the present invention.

With regard to the monomers b) it should be noted that in the case of polyethylene-oxyvinyl ethers, polypropyleneoxyvinyl ethers and the analogous polyethylene-oxyallyl ethers or polypropyleneoxyallyl ethers such as e.g. polyethylene glycol monoallyl ethers or mixed EO-PO-monoallyl ethers, the chain length of the polyalkyloxy building blocks of the monomers is in principle unlimited but n≦10 has certain advantages.

The water-soluble polymers that are used according to the invention can be obtained using a number of possible production processes. Preferred methods are radical polymerization in water or in an aqueous mixture containing a maximum of 30% by weight of an organic solvent, and also emulsion polymerization and solvent-free bulk polymerization.

The water-soluble polymers as drying aids can be used in a dry form e.g. in a powder form and also in the form of aqueous solutions that contain 1 to 99% by weight of the water-soluble polymers, amounts between 20 and 70% by weight being preferred and amounts between 35 and 60% by weight being especially preferred.

Irrespective of how the water-soluble polymers have been obtained or whether the drying aids are used in a powder form or in an aqueous solution, the present invention provides that the drying aids are added in the production process for dispersants or redispersion powders in amounts of up to 50% by weight and preferably between 5 and 30% by weight, in particular from 10 to 20% by weight based on the dispersant or the polymer dispersion.

Since dispersants are obtained in a powder form in particular with the aid of known spray drying processes, the present invention also takes into consideration the use of the drying aids preferably in these processes. In this case the drying aid can in particular be used in a contact drier, fluidized-bed drier or band drier or in a drying process that is carried out with the aid of heat radiation such as infrared or microwave radiation.

The water-soluble polymers can preferably be used in the production of a dispersant which is composed of structural elements containing polyoxyalkylene, carboxylic acid and/or carboxylic acid anhydride monomers as known in particular from the patent documents WO 97/39 037, EP-A 0 610 699 or WO 98/28 353.

With regard to the polymeric dispersant in powder form and the redispersion powder the invention provides that the drying aid is used in such a manner that a polymeric dispersant in powder form is obtained which has a residual moisture content of <5% by weight and preferably <2% by weight.

It may indeed be expedient to also add appropriate, more or less finely dispersed quality-improving additives to the polymeric dispersant that has been produced with the drying aid after its production so that the polymeric dispersant powder remains resistant to agglutination and caking during transport and storage in hot climate zones. There is no particular limitation to the type of these additives but the respective materials should have a good physical and chemical compatibility with the dispersant. The dispersive action of the agent should not be adversely affected and the quality-improving properties should be apparent even when only small amounts of the additives are added. In this connection the present invention envisages in particular the use of chalk, silicic acid, calcite, dolomite, quartz powder, bentonite, pumice powder, titanium dioxide, aluminium oxide, flue ash, cements, silicates, talcum, mica, anhydrite, lime, kieselguhr, gypsum, magnesite, clay, kaolin, powdered slate and powdered mineral stone, barium sulfate and mixtures thereof as quality-improving additives. The quality-improving additives should particularly preferably be used in a finely dispersed form and in this case in particular with a particle size of 0.1 to 1000 μm.

The polymeric dispersants obtained by using the drying aids according to the invention are especially suitable as additives for applications in construction chemicals and according to the invention can be preferably added to mineral building materials in amounts of 0.05 to 5% by weight based on the basic setting system where the invention envisages the addition of the powdered polymeric dispersants obtained according to the invention especially to mineral systems such as bitumen-containing building materials, building materials based on hydraulically setting binders such as cement or based on latent hydraulically setting binders, gypsum, anhydrite or other calcium sulfate-based building materials, ceramic pastes, fire-resistant materials, oil field building materials and dispersion-based building materials.

Furthermore, an inventive embodiment is preferred which is a variant of the present invention in which the drying aid is added to an aqueous dispersion of a redispersible organic binder consisting of a base polymer from the group comprising vinyl ester, styrene, acrylate, vinyl chloride or polyurethane polymers.

In this case the aqueous dispersion of a redispersible organic binder can additionally contain, in each case based on the base polymer,
a) up to 30% by weight of a cement liquefier and/or
b) up to 30% by weight of a protective colloid such as polyvinyl alcohol and/or
c) up to 2% by weight of at least one surface-active substance such as emulsifiers or wetting agents and/or
d) up to 3% by weight of a thickening agent such as polyacrylic acid and/or
e) up to 2% by weight of an antifoaming agent.

Within the scope of this invention and with regard to the products produced using the drying aids in the form of redispersion powders, the following can be additionally added
a) 1 to 30% by weight based on the total weight of the polymeric components of a fine antiblocking agent such as finely ground aluminium silicates, kieselguhr, colloidal silica gel, pyrogenic silicic acid, precipitated silicic acid, microsilica, kaolin, talcum, cements, diatomaceous earth, calcium and/or magnesium carbonate and magnesium hydrosilicate and
b) 0.1 to 10% by weight based on the base polymer of further additives.

With regard to the redispersion powders that are obtained it is preferable to use them in mineral setting building materials and in tile adhesives, fillers, gypsum building materials, lime mortars, cement mortars, plasters and dry mortars. It is, however, also possible to use them in adhesive compositions and paints and/or as the sole binding agent for coating agents.

Finally the present invention also encompasses a powder with a redispersing action which can be produced using the water-soluble polymers as a drying aid or by one of the described variants.

The invention also claims a building material composition which contains
    10 to 60% by weight of a mineral binder,
    0.1 to 20% by weight of a polymer powder produced using the drying aid as claimed in one of the claims 1 to 9,
    up to 25% by weight of common auxiliary agents, in each case based on the total composition and
    as the remaining amount additives such as sand, fillers, pigments, natural fibres and/or synthetic fibres.

The use according to the invention of water-soluble polymers as drying aids for producing redispersion powders and/or polymeric dispersants in a powder form allows spray drying processes that are otherwise problematic to be carried out without difficulty since the starting polymers of the dispersant that have previously been used especially in aqueous solutions now no longer decompose even under extreme temperature stress and the resulting products as polymeric powders are no longer for example produced in an oily form and they do not agglomerate. The sticking to the drier wall which occurred almost regularly can now be completely avoided and the laborious grinding steps with subsequent sieving which were previously carried out due to the contents of inorganic inert material can be dispensed with completely.

The following examples illustrate the advantages of the use according to the invention.

EXAMPLES

I. Production of Redispersion Powders:

Aqueous dispersions stabilized with polyvinyl alcohol each having a solids content of 50% by weight based on a vinyl acetate-ethylene copolymer (dispersion 1) or based on an ethylene-vinyl chloride-vinyl laurate-terpolymer (dispersion 2) of the Wacker Polymer System GmbH were used to produce the respective solutions of the inventive examples 1 to 4.

In addition drying aids produced by the following examples of synthesis were used:

Synthesis Example 1

98 g maleic anhydride, 33.2 g 2-acrylamide-2-methylpropanesulfonic acid (AMPS), 65 g hydroxypropylacrylate and 36 g acrylic acid were dissolved in 460 g water in a reaction vessel equipped with a reflux cooler, stirrer, thermometer, drip funnel and nitrogen gassing. Under a nitrogen supply, the reaction solution was heated in a water bath to 60° C. and 4.3 g ammonium peroxodisulfate and 8.5 g mercaptoethanol in 20 g water were added dropwise. The reaction mixture was stirred for 2 hours at 70° C. under nitrogen, then cooled to room temperature and neutralized to pH 7.0 with sodium hydroxide solution. The resulting product was a clear polymer solution with a solids content of 44% by weight and a molecular weight Mw~5000.

Synthesis Example 2

Corresponding to the process of synthesis example 1, 46 g acrylic acid, 43.3 g hydroxypropylacrylate, 43.4 g itaconic acid and 30 g sodium methallylsulfonic acid were added to 350 g water were reacted in the presence of 2.5 g ammonium peroxodisulfate and 5.0 g 2-mercaptoethanol. The result was a clear polymer solution with a solids content of 40% by weight and a molecular weight Mw~7000.

The following solutions were used in the spray drying process:

Example 1

4000 parts by weight of dispersion 1 were homogeneously mixed with 750 g of a 44% aqueous solution of a drying aid according to synthesis example 1 (corresponds to 16.5% by weight copolymer added to 100% by weight dispersion solid) and diluted with 1075 g water to a solids content of 40% by weight.

Example 2

4000 parts by weight of dispersion 1 were homogeneously mixed with 900 g of a 40% aqueous solution of a drying aid according to synthesis example 2 (corresponds to 18% by weight copolymer added to 100% by weight dispersion solid) and diluted with 1000 g water to a solids content of 40% by weight.

Example 3

4000 parts by weight of dispersion 2 were homogeneously mixed with 795 g of a 44% aqueous solution of a drying aid according to synthesis example 1 (corresponds to 17.5% by weight copolymer added to 100% by weight dispersion solid) and diluted with 1080 g water to a solids content of 40% by weight.

Example 4

4000 parts by weight of dispersion 1 were homogeneously mixed with 1000 g of a 40% aqueous solution of a drying aid according to synthesis example 2 (corresponds to 20% by weight copolymer added to 100% by weight dispersion solids) and diluted with 1000 g water to a solids content of 40% by weight.

Example 5

Comparison

Vinnapas RE5011, a commercially available redispersion powder from Wacker Polymer Systems GmbH.

The subsequent spray dying was carried out in a laboratory drier from the Nitro Company. The aqueous polymer dispersion that was to be dried in each case was sprayed by a rotating disk and nitrogen compressed to 4 bar served as the atomization component. The inlet temperature of the drier gas was 130° C. and its exit temperature was 60 to 64° C.

The powders obtained from the solutions of examples 1 to 4 can be redispersed in an aqueous medium in a completely satisfactory manner. As table 2 shows the redispersion powders produced in this manner have much better flow properties than the comparative example 5 although the polymeric drying aids that were used in each case do not have a dispersing action in pure Portland cement or aluminous mortars (see test formulation 2 and table 2).

Due to their very good flow properties, the redispersion powders produced according to the invention also have very good self healing properties without delaying the setting behaviour of the composition (see table 1). The self healing property is assessed by a so-called knife cut test. The setting behaviour is characterized, on the one hand, by determining the Shore D hardness and, on the other hand, by the solidification behaviour according to Vicat.

Test Formulation 1:

| [weight %] | form. 1.1 | form. 1.2 | form. 1.3 | form. 1.4 | form. 1.5 | form. 1.6 |
|---|---|---|---|---|---|---|
| Portland cement (CEM 1 42.5 R Kiefersfelden) | 18.50 | 18.50 | 18.50 | 18.50 | 18.50 | 18.50 |
| aluminous cement (Fondu Lafarge) | 11.50 | 11.50 | 11.50 | 11.50 | 11.50 | 11.50 |
| calcium sulfate (anhydrous synthetic anhydrite Solvay) | 6.50 | 6.50 | 6.50 | 6.50 | 6.50 | 6.50 |
| quartz sand H33 (0.1-0.315 mm) | 41.20 | 41.20 | 41.20 | 41.20 | 41.20 | 40.80 |
| chalk powder Omyycarb 20 BG (10-20 αm) | 19.40 | 19.40 | 19.40 | 19.40 | 19.40 | 19.40 |
| hydroxycellulose ether (Tylose H 300 P2) | 0.05 | 0.05 | 0.05 | 0.05 | 0.05 | 0.05 |

-continued

| [weight %] | form. 1.1 | form. 1.2 | form. 1.3 | form. 1.4 | form. 1.5 | form. 1.6 |
|---|---|---|---|---|---|---|
| Lithium carbonate | 0.10 | 0.10 | 0.10 | 0.10 | 0.10 | 0.10 |
| defoaming agent Agitan P 800 | 0.15 | 0.15 | 0.15 | 0.15 | 0.15 | 0.15 |
| potassium sodium tartrate tetrahydrate | 0.40 | 0.40 | 0.40 | 0.40 | 0.40 | 0.40 |
| flow agent Meflux 1641 (SKW Polymers GmbH) | — | — | — | — | — | 0.40 |
| redispersion powder produced according to example 1 | 2.20 | — | — | — | — | — |
| redispersion powder produced according to example 2 | — | 2.20 | — | — | — | — |
| redispersion powder produced according to example 3 | — | — | 2.20 | — | — | — |
| redispersion powder produced according to example 4 | — | — | — | 2.20 | — | — |
| comparative example 5 standard redispersion powder | — | — | — | — | 2.20 | 2.20 |
| mixing water in each case 20.00 weight % | | | | | | |
| powder mixture (sum of the components) | 100.0 | 100.0 | 100.0 | 100.0 | 100.0 | 100.0 |

TABLE 1

Application technology testing

| | Flow measure [mm] after x mm according to EN 12 706 | | | | | Knife cut test after x min | | | | | Shore $D \geq 50$ [h:min] | Solidification (Vicat) [h:min] | |
|---|---|---|---|---|---|---|---|---|---|---|---|---|---|
| | 5' | 15' | 30' | 45' | 60' | 7' | 15' | 30' | 45' | 60' | | EB | EE |
| form.1.1 | 160 | 163 | 163 | 162 | 162 | 1 | 1 | 2 | 2 | 2 | 7:00 | 3:00 | 3:40 |
| form.1.2 | 157 | 152 | 150 | 145 | 137 | 1 | 2 | 2 | 2 | 3 | 6:30 | 2:45 | 3:30 |
| form.1.3 | 154 | 154 | 154 | 152 | 150 | 1 | 1 | 2 | 2 | 3 | 6:00 | 2:30 | 3:00 |
| form.1.4 | 158 | 160 | 163 | 163 | 163 | 1 | 2 | 2 | 2 | 2 | 7:00 | 3:10 | 3:40 |
| form.1.5 | 59 | 40 | 35 | 30 | 30 | 5 | 5 | 6 | 7 | 7 | 6:00 | 2:15 | 3:00 |
| form.1.6 | 158 | 160 | 163 | 163 | 163 | 1 | 2 | 2 | 2 | 3 | 7:15 | 3:20 | 4:15 |

Mixing Instructions:
½ min. interspersing, then
½ min. soaking, then
2 min. stirring with a spoon, then
1 min. maturing time, and
1 min. stirring with a spoon
Flow measure according to EN 12 706: with a ring d=30 mm, h=50 mm The determination of the flow measure and the knife cut test carried were carried out x min. after starting mixing.

Assessment Scale (Knife Cut Test):
score 1: cut runs completely
score 2: cut runs, but is visible
score 3: cut runs, but the edge is visible
score 4: cut runs, but the edge is very visible
score 5: cut runs poorly
score 6: cut runs poorly, notch
score 7: cut does not run Test Formulation 2:

| [weight %] | form.2.1 | form.2.2 | form.2.3 | form.2.4 | form.2.5 | form.2.6 |
|---|---|---|---|---|---|---|
| Portland cement (CEM I 42.5 R Kiefersfelden) | 900.00 | 900.00 | 900.00 | — | — | — |
| aluminous cement (Fondu Lafarge) | — | — | — | 900.00 | 900.00 | 900.00 |
| standard quartz sand (0.2 mm, EN 196-1) | 1350.00 | 1350.00 | 1350.00 | 1350.00 | 1350.00 | 1350.00 |
| defoamer (Agitan P 800) | 0.45 | 0.45 | 0.45 | 0.45 | 0.45 | 0.45 |
| dispersant (Melflux 164 F, SKW Polymer GmbH) | 0.45 | | | 0.45 | | |
| drying aid according to example 1 (based on solid) | | 0.45 | | | 0.45 | |
| drying aid according to Example 2 (based on solid) | | | 0.45 | | | 0.45 |
| mixing water (water/cement ratio = 0.36) | 324.00 | 324.00 | 324.00 | 324.00 | 324.00 | 324.00 |

The mortar mixtures were prepared according to DIN EN 196-1, paragraph 6.3: The flow properties were determined in a flow channel test according to the pouring mortar guideline of the German Concrete Association e.V. (version September 1990, editorial revision 1996) in each case after 5, 30 and 60 min.

TABLE 2

| flow channel measure [cm] | form.2.1 | form.2.2 | form.2.3 | form.2.4 | form.2.5 | form.2.6 |
|---|---|---|---|---|---|---|
| after 5 min. | 63 | n.f. | n.f. | 61 | 20 | 21 |
| after 30 min. | 60 | n.f. | n.f. | 59 | 20 | n.f. |
| after 60 min. | 53 | n.f. | n.f. | 27 | n.f. | n.f. | n.f.: not flowable

II. Production of Dispersants in a Powder Form:

Comparative Examples

Drying Experiments

Example 1.1

An aqueous dispersant solution prepared according to DE 195 13 126 was evaporated in a rotary evaporator at 80° C. and 100 mbar for 2 h. A very viscous, wax-like mass formed in this process which was subsequently scratched from the glass wall in a warm state. Wax-like, sticky polymer lumps are formed after cooling to room temperature (FIG. 1) which could not be ground further due to their consistency. It is not possible to convert the aqueous polymer solution in a corresponding polymer powder in this manner.

Example 1.2

An aqueous dispersant solution produced according to DE 199 26 611 A1 was applied in a thin layer of ca. 3 mm to a baking tray and dried for 4 h at 130° C. in a drying cabinet. As the solids content increased the solution became increasingly viscous and bubbles formed. The consistency of the hot concentrate was sticky and rubber-elastic. When it was cooled to temperatures below 40° C., the mass solidified to form a brittle layer which was scratched from the tray. It was observed that as the layer thickness increased, the rubber-elastic polymer mass no longer completely dried through. Hence this polymer mass is still slightly sticky after cooling to room temperature and the residual moisture content varies between 4 and 10%. Moreover inhomogeneities occurred above a layer thickness of about 2 mm when the polymer solution was dried which can be observed alone on the basis of the different colouration of the uppermost and lowest polymer layer (FIG. 2).

Example 1.3

An aqueous dispersant solution produced according to DE 199 26 611 A1 was admixed with 20% by weight of fine $CaCO_3$ having a particle size of <200 μm and dried in a contact drier from the List AG Company at 80° C. and 60 mbar. Only large hard lumps were obtained in this process after a drying time of 40 min (FIG. 3).

Inventive Examples

Drying Examples

Aqueous dispersant solutions produced according to DE 195 13 126 and DE 199 26 611 A1 were each fed into a laboratory spray drier from the LabPlant Company using a metering pump in each case without [A; B] and with drying aids (auxiliary polymer AP) [A1, A2, B1, B2] and sprayed into the flow of hot air. The inlet temperature was 180° C., the exit temperature of the dry air was 50 to 70° C. The polymers AP1 and AP2 having the following compositions were used as drying aids:

| AP1: | maleic anhydride | 36.8% by weight |
|---|---|---|
|  | 2-acrylamido-2-methyl propanesulfonic acid (AMPS) | 38.8% by weight |
|  | hydroxypropylacrylate | 24.4% by weight |
| AP2: | acrylic acid | 29.0% by weight |
|  | hydroxypropylacrylate | 58.3% by weight |
|  | Na-methallylsulfonic acid | 12.7% by weight |

They were produced according to the following processes:

AP1:

98 g maleic anhydride, 103.5 g 2-acrylamido-2-methylpropanesulfonic acid (AMPS) and 65.1 g hydroxypropylacrylate were dissolved in 530 g water in a reaction vessel equipped with a reflux cooler, stirrer, thermometer, drip funnel and nitrogen gassing. Under a nitrogen supply the reaction solution was heated in a water bath to 60° C. and 4.3 g ammonium peroxodisulfate and 8.5 g mercaptoethanol in 20 g water were added dropwise. The reaction mixture was stirred for 2 hours at 70° C. under nitrogen, then cooled to room temperature and neutralized to pH 7.0 with sodium hydroxide solution. The resulting product was a clear polymer solution with a solids content of 40% by weight and a molecular weight Mw of ~5000.

AP2:

46 g acrylic acid, 92.2 g hydroxypropylacrylate and 20 g sodium methallylsulfonic acid were dissolved in 380 g water according to the process described for AP1. Subsequently the solution was neutralized with 55 g of a 50% sodium hydroxide solution. Under a nitrogen supply the reaction solution was heated in a water bath to 55° C. and the polymerization was started by adding 20 g of a 20% aqueous ammonium persulfate solution. The reaction mixture was stirred for 4 hours at 60° C. under nitrogen. The resulting product was a clear polymer solution with a solids content of 45% by weight and a molecular weight Mw of ~7000.

The results of the spray drying are shown in the following table 3: The name AP represents the content of the respective auxiliary polymer expressed as % by weight based on the solids content of the polymer solution to be dried.

TABLE 3

| Experiment | polymer according to | AP [%] | wall coating of the drier | powder yield [% of theory] | residual moisture content [%] |
|---|---|---|---|---|---|
| A | DE 195 13 126 | — | oil, flowing | n.a. | n.a. |
| B | DE 199 26 611 A1 | — | oil, flowing + some rubber-elastic lumps | n.a. | n.a. |
| A1 | DE 195 13 126 | 10 | none | >98% | <1% |
| A2 | DE 195 13 126 | 15 | none | >98% | <1% |
| B1 | De 199 26 611 A1 | 10 | none | >98% | <1% |
| B2 | DE 199 26 611 A1 | 15 | none | >98% | <1% | n.a.: not applicable

FIG. 4 shows the powder dispersant of experiment B1 after spray drying.

3: Examples of Application:

The following examples elucidate the flow property and physical properties of cementitious systems. Aqueous polymer solutions (A; B) and powder dispersants that had been spray dried with the aid of drying aids (AP) (A1, A2 and B1, B2) were used in a comparison:

- A: aqueous solution of a polymeric dispersant (PDM 1) according to DE 195 13 126
- B: aqueous solution of a polymeric dispersant (PDM 2) according to DE 199 26 611 A1
- A1: spray dried powder after adding 10% by weight AP 1 to the aqueous solution of PDM 1
- A2: spray dried powder after adding 15% by weight AP 2 to the aqueous solution of PDM 1
- B1: spray dried powder after adding 10% by weight AP 1 to the aqueous solution of PDM 2
- B2: spray dried powder after adding 15% by weight AP 2 to the aqueous solution of PDM2

The following mixture was selected as a standard starting formulation:

| | Mass [g] |
|---|---|
| Portland cement (CEM 1 42.5 R) | 900.00 |
| standard quartz sand (0-2 mm, EN 196-1) | 1350.00 |
| defoaming agent (Agitan P 800) | 0.45 |
| dispersant | 0.2 (A-, B-series) and 0.3 (1.1.; 1.2) % by weight |
| mixing water | 288 g |

Mixing Protocol and Methods of Determination:

The mortar mixtures were prepared according to DIN EN 196-1, paragraph 6.3: The flow properties were determined in a flow channel test according to the pouring mortar guideline of the German Concrete Association e.V. (version September 1990, editorial revision 1996) in each case after 5, 30 and 60 min.

In order to determine the compressive strength, prisms having dimensions of 4×4×16 cm were made from the respective mortars, the formwork was removed after 24 h and they were stored in a normal climate (+20° C. and 65% relative humidity) for further hardening.

The determined flow channel values are summarized in table 4 and the compressive strengths of the respective mortar mixtures at various times are shown in table 5.

TABLE 4

Flow channel measures of the mortar mixtures:

| dispersant according to example | dosage weight % (based on cement) | W/C value | flow channel measure [cm] after | | |
|---|---|---|---|---|---|
| | | | 5 min | 30 min | 60 min |
| 1.1 | 0.30 | 0.32 | not flowable | not flowable | not flowable |
| 1.2 | 0.30 | 0.32 | not flowable | not flowable | not flowable |
| A | 0.20 | 0.32 | 75 | 71 | 65 |
| A1 | 0.20 | 0.32 | 71 | 66 | 60 |
| A2 | 0.20 | 0.32 | 70 | 64 | 60 |
| B | 0.20 | 0.32 | 81 | 75 | 70 |
| B1 | 0.20 | 0.32 | 75 | 70 | 67 |
| B2 | 0.20 | 0.32 | 73 | 68 | 64 |

TABLE 5

Fresh mortar bulk density and compressive strength of the mortar prisms

| dispersant according to example | fresh mortar bulk density [g/cm³] | compressive strength | | | | |
|---|---|---|---|---|---|---|
| | | [N/mm2] after 12 h | [N/mm2] after 16 h | [N/mm2] after 24 h | [N/mm2] after 7 d | [N/mm2] after 28 d |
| A | 2.29 | 3.2 | 10.6 | 29.8 | 65.7 | 79.3 |
| A1 | 2.29 | 3.0 | 10.1 | 29.5 | 65.0 | 80.0 |
| A2 | 2.31 | 2.7 | 8.5 | 28.8 | 64.3 | 79.9 |
| B | 2.30 | 9.5 | 25.1 | 40.2 | 71.0 | 81.4 |
| B1 | 2.29 | 9.0 | 24.4 | 39.5 | 68.8 | 82.3 |
| B2 | 2.31 | 8.3 | 24.5 | 41.0 | 68.5 | 82.0 |

The invention claimed is:

1. A composition which is effective for producing a polymeric dispersant in a powder form, the composition comprising a solution of a water soluble polymeric drying aid and a solution of a water soluble polymeric dispersant, the water-soluble polymeric drying aid comprising:

A. monoethylenically unsaturated monomers carrying acidic groups in an acidic, or partially or completely neutralized form, the monoethylenically unsaturated monomers selected from the group consisting of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi)esters of the monoethylenically unsaturated monomers, amides of the monoethylenically unsaturated monomers, anhydrides of the monoethylenically unsaturated monomers, and mixtures thereof.

2. The composition according to claim 1, the water soluble polymeric drying aid further comprising:

B. neutral monoethylenically unsaturated monomers that are effective for copolymerizing with the monomers of group A, the neutral monoethylenically unsaturated monomers selected from the group consisting of (meth)acrylnitrile, (meth)allyl alcohol, vinyl ethers, N-vinylacetamide, N-vinyllactams, N-vinylpyrrolidone, N-vinylimidazole, silicon-functional comonomers and mixtures thereof.

3. The composition as claimed in claim 2, wherein the water-soluble polymeric drying aid contains at least 20% by weight of monomers A and a maximum of 80% by weight of monomers B.

4. The composition as claimed in claim 1, wherein the acidic groups of the monoethylenically unsaturated monomers A are at least partially neutralized before, during or after polymerization with alkali and/or alkaline earth hydroxides, ammonia, an amine, polyamine, amino alcohol or mixtures thereof.

5. The composition as claimed in claim 1, wherein the monomers of group A are selected from hydroxyalkyl(meth)acrylate, where alkyl=$C_1$ to $C_5$, hydroxyalkylpolyethyleneoxy- and -propyleneoxy- or -butyleneoxy(meth)-acrylate, where alkyl=$C_1$ to $C_5$.

6. The composition as claimed in claim 1, wherein the water-soluble polymeric drying aid has an average molecular weight $M_n$ of 1000 to 100,000 g/mol.

7. The composition as claimed in claim 6, wherein the water-soluble polymeric drying aid has an average molecular weight $M_n$ between 2000 and 70,000 g/mol.

8. The composition as claimed in claim 7, wherein the water-soluble polymeric drying aid has an average molecular weight $M_n$ between 3000 and 50,000 g/mol.

9. The composition as claimed in claim 1, wherein the water-soluble polymeric drying aid is obtainable by radical polymerization in water or in an aqueous mixture containing a maximum of 30% by weight of an organic solvent, by emulsion polymerization or by a solvent-free bulk polymerization.

10. A method of producing a polymeric dispersant in a powder form, the method comprising:

mixing a water soluble polymeric drying aid and a water soluble polymeric dispersant in water to provide a solution of both the dispersant and drying aid; and drying the solution of the drying aid and water soluble dispersant to provide a powdered dispersant having a residual moisture content of less than 5 weight percent, the water soluble polymeric drying aid comprising polymerized monoethylenically unsaturated monomers carrying acidic groups in an acidic, or partially or completely neutralized form, the monoethylenically unsaturated monomers selected from the group consisting of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi) esters of the monoethylenically unsaturated monomers, amides of the monoethylenically unsaturated monomers, anhydrides of the unsaturated monomers, and mixtures thereof.

11. The method of producing a polymeric dispersant as claimed in claim 10, wherein the water soluble polymeric drying aid is blended with the water soluble dispersant in amounts between 5 and 30% by weight based on the dispersant or polymer solution.

12. The method of producing a polymeric dispersant as claimed in claim 10, wherein the solution of water soluble drying aid and the water soluble dispersant is spray dried.

13. The method of producing a polymeric dispersant as claimed in claim 10, wherein the drying of the solution of the water-soluble drying aid and the water soluble dispersant is with equipment that is selected from the group consisting of a contact drier, fluidized-bed drier, band drier, a drier using infrared radiation, a drier using microwave radiation and combinations thereof.

14. A polymeric dispersant in powder form, the polymeric dispersant in powder form produced by mixing a water soluble polymeric drying aid and a water soluble polymeric dispersant to provide a solution of water soluble polymeric drying aid and the dispersant, the water soluble dispersant including elements selected from the group consisting of polyoxyalkylene, carboxylic acid, acid anhydride and combinations thereof; and drying the solution of water soluble polymeric drying aid and water soluble polymeric dispersant to provide a dried dispersant having a residual moisture content of less than 5 weight percent, the water soluble polymeric drying aid comprising polymerized monoethylenically unsaturated monomers carrying acidic groups in an acidic, or partially or completely neutralized form, the monoethylenically unsaturated monomers selected from the group consisting of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi) esters of the monoethylenically unsaturated monomers, amides of the monoethylenically unsaturated monomers, anhydrides of the unsaturated monomers, and mixtures thereof.

15. The polymeric dispersant according to claim 14, wherein the dried polymeric dispersant is in a powder form and has a residual moisture content of <2% by weight.

16. The polymeric dispersant according to claim 15, the powdered dispersant further comprising quality-improving additives selected from the group consisting of chalk, silicic acid, calcite, dolomite, quartz powder, bentonite, pumice powder, titanium dioxide, aluminium oxide, flue ash, cements, silicate, talcum, mica, anhydrite, lime, kieselguhr, gypsum, magnesite, clay, kaolin, powdered slate, powdered mineral stone, barium sulfate and mixtures thereof.

17. The polymeric dispersant according to claim 16, wherein the quality-improving additives are used in a finely dispersed form having a particle size of 0.1 to 1000 μm.

18. A building material comprising basic setting system and at least one water soluble polymeric dispersant as claimed in claim 14, wherein the water soluble polymeric dispersant is added in amounts of 0.05 to 5% by weight based on the basic setting system.

19. The building material as claimed in claim 18, wherein the building material further includes building materials selected from the group consisting of bitumen-containing building materials, building materials based on hydraulically setting binders and combinations thereof.

20. A building material composition, comprising:
10 to 60% by weight of a mineral binder,
0.1 to 20% by weight of the water soluble polymeric dispersant of claim 14,
up to 25% by weight of common auxiliary agents, in each case based on the weight of total composition, and
additives selected from the group consisting of sand, fillers, pigments, natural fibres, synthetic fibres and combinations thereof.

21. The method according to claim 10 wherein the process further comprises mixing the water soluble polymeric drying aid with the solution of dispersant in an amount of not more than 50 weight percent based upon the weight of the dispersant.

22. The method according to claim 10 wherein the water soluble polymeric drying aid further comprises:
additional neutral monoethylenically unsaturated monomers that are effective for copolymerizing with the acidic or neutralized monomers of claim 10, the additional neutral monoethylenically unsaturated monomers selected from the group consisting of (meth)acrylnitrile, (meth)allyl alcohol, vinyl ethers, N-vinyl-acetamide, N-vinyllactams, N-vinylpyrrolidone, N-vinylimidazole, silicon-functional comonomers and mixtures thereof.

23. The polymeric dispersant in powder form according to claim 14 wherein the water soluble polymeric drying aid further comprises:
additional neutral monoethylenically unsaturated monomers that are effective for copolymerizing with the acidic or neutralized monomers of claim 14, the additional neutral monoethylenically unsaturated monomers selected from the group consisting of (meth)acrylnitrile, (meth)allyl alcohol, vinyl ethers, N-vinyl-acetamide, N-vinyllactams, N-vinylpyrrolidone, N-vinylimidazole, silicon-functional comonomers and mixtures thereof.

24. The building material according to claim 19 wherein the building material is selected from the group consisting of cement, latent hydraulically setting binders, gypsum, anhydrite, ceramic paste, fire-resistant paste, oil field building material, dispersion-based building material and combinations thereof.

25. The method as claimed in claim 10, wherein an aqueous solution containing 1 to 99% by weight of the water-soluble polymeric drying aid is blended with the water soluble polymeric dispersant.

26. The method as claimed in claim 25, wherein the aqueous solution of the water soluble polymeric drying aid contains 20 to 70% by weight of the drying aid.

27. The method as claimed in claim 26, wherein the aqueous solution of the water soluble polymeric drying aid contains between 35 and 60% by weight of the drying aid.

* * * * *